(12) United States Patent
Kalina (10) Patent No.: US 7,841,179 B2
(45) Date of Patent: Nov. 30, 2010

(54) POWER SYSTEM AND APPARATUS UTILIZING INTERMEDIATE TEMPERATURE WASTE HEAT

(75) Inventor: Alexander I. Kalina, Hillsborough, CA (US)

(73) Assignee: Kalex, LLC, Belmont, CA (US)

( * ) Notice: Subject to any disclaimer, the term of this patent is extended or adjusted under 35 U.S.C. 154(b) by 1089 days.

(21) Appl. No.: 11/514,290

(22) Filed: Aug. 31, 2006

(65) Prior Publication Data

US 2008/0053095 A1    Mar. 6, 2008

(51) Int. Cl.
*F01K 25/06* (2006.01)

(52) U.S. Cl. .............................. 60/649; 60/651; 60/653; 60/671

(58) Field of Classification Search .................. 60/649, 60/651, 671, 653, 673
See application file for complete search history.

(56) References Cited

U.S. PATENT DOCUMENTS

| | | | | |
|---|---|---|---|---|
| 4,548,043 A * | 10/1985 | Kalina | ........................ | 60/673 |
| 4,586,340 A * | 5/1986 | Kalina | ........................ | 60/673 |
| 4,604,867 A * | 8/1986 | Kalina | ........................ | 60/653 |
| 6,735,948 B1 | 5/2004 | Kalina | ........................ | 60/649 |
| 6,769,256 B1 | 8/2004 | Kalina | ........................ | 60/653 |
| 6,820,421 B2 | 11/2004 | Kalina | ........................ | 60/649 |
| 6,829,895 B2 | 12/2004 | Kalina | ........................ | 60/649 |
| 6,910,334 B2 | 6/2005 | Kalina | ........................ | 60/651 |
| 6,923,000 B2 | 8/2005 | Kalina | ........................ | 60/649 |
| 6,941,757 B2 | 9/2005 | Kalina | ........................ | 60/649 |
| 6,968,690 B2 | 11/2005 | Kalina | ........................ | 60/649 |
| 7,021,060 B1 | 4/2006 | Kalina | ........................ | 60/649 |
| 7,043,919 B1 | 5/2006 | Kalina | ........................ | 60/651 |
| 7,055,326 B1 | 6/2006 | Kalina | ........................ | 60/649 |
| 7,065,967 B2 | 6/2006 | Kalina | ........................ | 50/649 |
| 7,065,969 B2 | 6/2006 | Kalina | ........................ | 60/670 |
| 2005/0061654 A1 | 3/2005 | Kalina | ........................ | 203/21 |
| 2006/0096288 A1 | 5/2006 | Kalina | ........................ | 60/649 |
| 2006/0096290 A1 | 5/2006 | Kalina | ........................ | 60/649 |
| 2006/0165394 A1 | 7/2006 | Kalina | ........................ | 392/386 |
| 2006/0199120 A1 | 9/2006 | Kalina | ........................ | 431/9 |

OTHER PUBLICATIONS

U.S. Appl. No. 11/399,287, filed Apr. 5, 2006, Kalina.
U.S. Appl. No. 11/399,306, filed Apr. 5, 2006, Kalina.
U.S. Appl. No. 11/238,173, filed Sep. 28, 2005, Kalina.
U.S. Appl. No. 11/235,654, filed Sep. 22, 2005, Kalina.
U.S. Appl. No. 11/227,991, filed Sep. 15, 2005, Kalina.

* cited by examiner

*Primary Examiner*—Hoang M Nguyen
(74) *Attorney, Agent, or Firm*—Robert W Strozier (57) ABSTRACT

System and method is disclosed to increase the efficient of internal combustion engines using to generate electric power, where the system and method converts a portion of thermal energy produced in the combustion process to a usable form of energy.

26 Claims, 3 Drawing Sheets

POWER SYSTEM AND APPARATUS UTILIZING INTERMEDIATE TEMPERATURE WASTE HEAT

BACKGROUND OF THE INVENTION

1. Field of the Invention

The present invention relates to the utilization of waste heat from diesel or other types of internal combustion engines used in power generation.

More particularly, the present invention relates to utilizing waste heat from diesel or similar types internal combustion engines used for power generation, where the engines are relatively small and produce an exhaust gas effluent stream having an initial temperature not more than 900° F., and where the system produces a spent exhaust effluent stream having a final temperature as low as 250° F.

2. Description of the Related Art

A specific characteristic of small diesel engines or other similar internal combustion engines used for power generation is that they produce relatively low temperature exhaust gas effluent stream.

Although the utilization of heat from exhaust gas can be done in many different ways using conventional type of bottoming cycles, these bottoming cycles generally require large capital investments and are not geared for use with small diesel engines used in power generation.

Thus, not only is there an need in the art for more efficient and effective means for extracting usable work from waste heat generated by small internal combustion engines.

SUMMARY OF THE INVENTION

The present invention provides a simple bottoming cycle for use with small internal combustion engines used for power generation. In its simplest embodiment, the cycle includes a turbine for extracting energy from a fully vaporized multi-component working fluid, a condenser, two heat exchangers and a separator designed to convert the spent working fluid into a liquid working fluid and into a partially vaporized working fluid stream and a recuperative heat recovery vapor generator designed to extract energy from an exhaust stream having a temperature not greater than about 900° F. to convert the partially vaporized working fluid stream into a fully vaporized and in certain embodiment superheated working fluid stream for energy extraction in the turbine. The cycle is a closed cycle for the working fluid.

The present invention also provides a simple bottoming cycle for use with small internal combustion engines used for power generation. In another embodiment, the cycle includes a turbine for extracting energy from a fully vaporized multi-component working fluid, a condenser, three heat exchangers and a separator designed to convert the spent working fluid into a liquid working fluid and into a partially vaporized working fluid stream and a recuperative heat recovery vapor generator designed to extract energy from an exhaust stream having a temperature not greater than about 900° F. to convert the partially vaporized working fluid stream into a fully vaporized and in certain embodiment superheated working fluid stream for energy extraction in the turbine. The cycle is a closed cycle for the working fluid.

The present invention also provides a simple bottoming cycle for use with small internal combustion engines used for power generation. The cycle comprises four multi-component fluid working solutions: a lean working solution having a highest concentration of the higher boiling component, a very rich working solution having a highest concentration of the lower boiling component, a rich working solution having a second highest concentration of the lower boiling component and an intermediate working solution having an intermediate concentration of the low boiling component. Stated differently, the stream have the following order of lower boiling component: [lower boiling component]$_{very\ rich}$>[lower boiling component]$_{rich}$>[lower boiling component]$_{intermediate}$>[low boiling component]$_{lean}$ and conversely [high boiling component]$_{lean}$>[higher boiling component]$_{intermediate}$>[higher boiling component]$_{rich}$>[higher boiling component]$_{very\ rich}$. Energy is extracted from the intermediate working solution stream, which can be fully vaporized and generally superheated directly or can be formed from a rich fully vaporized and superheated working solution stream and a lean fully vaporized and superheated working solution stream. Excess thermal energy in the spent intermediate working solution stream is used to heat and help vaporizing the stream that become the fully vaporized and generally superheated intermediate working solution stream. The lean and very rich streams are formed by separating a partially condensed spent intermediate working solution stream. The very rich stream is combined with a portion of the lean stream to from the rich working solution stream which is then fully condensed after transferring heat to a fully condensed higher pressure rich working solution stream. The cooled rich working fluid stream is then fully condensed by an external coolant stream and pressurized to form the higher pressure, rich working solution stream. The lean stream is pressurized and either combined with a partially vaporized rich working solution stream and the combined stream forwarded to the RHRVG or sent directly into the RHRVG along side the rich working solution stream and combined after the two stream are fully vaporized and generally superheated. Where the RHRVG derives its thermal energy from a gas exhaust stream from an internal combustion power generator.

The present invention provides a method for extracting an additional amount of power from a small internal combustion power generator including the step of passing an exhaust gas stream not exceed about 900° F. into a recuperative heat recovery vapor generator to produce a cooled exhaust stream and a fully vaporized, and in certain embodiments a superheated, multi-component stream. The fully vaporized and optionally superheated multi-component stream is then passed through a turbine or other similar energy conversion unit in which a portion of thermal energy in the stream is converted to a more useable form of energy such as electrical energy. The spent multi-component stream is then forwarded to a heat exchange, condensation and pressurization subsystem that converts the multi-component stream into a fully condensed multi-component stream which is then partially vaporized and passed into the recuperative heat recovery vapor generator.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found an apparatus, system and method can be devised for power generation from intermediated temperature waste heat as a heat source, such as the exhaust stream from small diesel power units. The apparatus includes a condenser HE1, two or three recuperative heat exchangers HE2, HE3 and HE4, and a recuperative heat recovery vapor generator RHRVG, turbine T1, a separator S1 and three pumps P1, P2 and P4. The system is relatively simple and permits ready installation and effectively conversion of waste heat or thermal energy into a more useable form of energy such as electrical or mechanical. The bottoming cycle significantly improves the overall power generation capability of such small diesel or other internal combustion power generation units.

The systems of this invention are designed for power generation using intermediate temperature waste heat as a heat source such as waste heat from smaller diesel power generation engines. The systems are designed to utilize heat sources with an initial temperature not more than or not to exceed about 900° F. producing an exhaust stream having a final temperature as low as 250° F. The systems are ideally designed for application to relatively small power units (up to 10 MW). A typical application of such a system is as a bottoming cycle to a diesel engine, using the exhaust stream of the diesel engine as the heat source.

The systems of this invention are designed to use a mixture of at least two components as a working fluid, (hereafter referred to as the "low boiling" and "high boiling" components). In certain embodiments, the working fluid for the systems of this invention are a mixture of water and ammonia, but the system can operate using other components with the same efficacy.

The working fluids suitable for use in the condensation apparatuses of this inventions is a multi-component fluid that comprises a lower boiling point material—the low boiling component—and a higher boiling point material—the high boiling component. The working fluid, a multi-component mixture of at least two components with different normal boiling temperatures. In the certain embodiments of the system, the mixture consists of water and ammonia, but other working fluids, such as a mixture of hydrocarbons, freons or other substances can be used as well. In other embodiments, the working fluids include, without limitation, an ammonia-water mixture, a mixture of two or more hydrocarbons, a mixture of two or more freons, a mixture of hydrocarbons and freons, or the like. In other embodiments, the working fluid comprises a mixture of water and ammonia. However, the fluid can comprise mixtures of any number of compounds with favorable thermodynamic characteristics and solubilities.

The dividing valves used in this invention are well known in the art and are used to split streams into two or more substream, where the flow going into each stream being controlled by the exact construction of the dividing valve or by a control on the valve setting so that the flow rate is changeable to maintain the system.

DETAILED DESCRIPTION OF THE DRAWINGS

Figure 1:
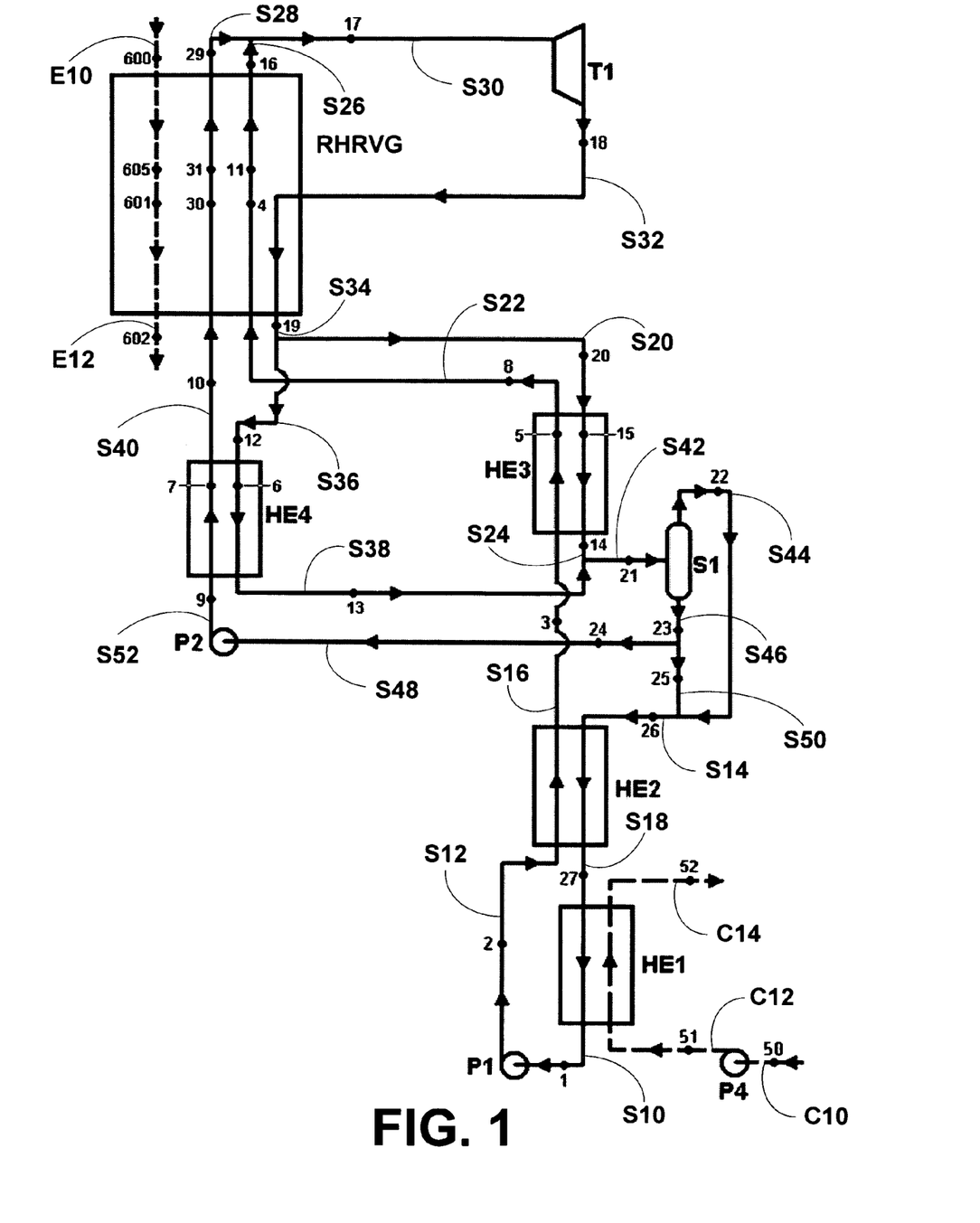
FIG. 1 an embodiment of an apparatus or system of this invention including a condenser HE1, three recuperative heat exchangers HE2, HE3 and HE4, a recuperative heat recovery vapor generator RHRVG, turbine T1, a separator S1 and three pumps P1, P2 and P4.

Referring now to FIG. 1, a conceptual flow diagram of an embodiment of a system of this invention, generally 100, is shown. The system 100 includes a condenser HE1, three recuperative heat exchangers HE2, HE3 and HE4, a separator S1, three pump P1, P2, and P4, a recuperative heat recovery vapor generator RHRVG and a turbine T1.

The system 100 operates as follows:

A fully condensed basic, rich working solution stream S10 (i.e., a working fluid with a high concentration of the low-boiling component) having parameters as at a point 1, is pumped by a first pump P1 to a desired higher pressure forming a higher pressure, rich working solution stream S12 having parameters as at a point 2. Thereafter, the stream S12 having the parameters as at the point 2 passes through a second heat exchanger HE2, where it is heated in counterflow by a returning rich working solution stream S14 having parameters as at a point 26 in a heat exchange process 2-3 or 26-27 as described below. As a result of the heat exchange process 26-27 or 2-3, a heated, higher pressure, rich working solution stream S16 having parameters as at a point 3, corresponding to a state of saturated liquid is formed as well as a partially condensed rich working solution stream S18 having parameters as at a point 27.

Thereafter, the stream S16 having the parameters as at the point 3 enters into a third heat exchanger HE3, where it is partially vaporized in heat exchange process 3-5-8 or 20-15-14 by a first returning intermediate working solution stream S20 having parameters as at a point 20 as described below forming a partially vaporized, higher pressure, rich working solution stream S22 having parameters as at a point 8 and a partially condensed spent intermediate working solution stream S24 having parameter as at a point 14. The partially vaporized, higher pressure, rich working solution stream S22 having the parameters as at the point 8 corresponds to a state of vapor-liquid mixture.

Thereafter, the partially vaporized, higher pressure, rich working solution S22 having the parameters as at the point 8 enters into a recuperative heat recovery vapor generator RHRVG, where it is fully vaporized and superheated in a heat exchange process 8-4-11-16 forming a higher pressure, superheated vapor, rich working solution stream S26 having parameters as at a point 16. The stream S26 is a rich working solution stream having parameters consistent with a state of higher pressure, superheated vapor.

Thereafter, the stream S26 having the parameters as at the point 16 is mixed with a lean working solution stream S28 having parameters as at a point 29, as described below. As a result of this mixing an intermediate working solution stream S30 having parameters as at a point 17 is formed. The stream S30 having the parameters as at the point 17 then enters into a turbine T1, where it is expanded, producing power, and forming a spent intermediate working solution stream S32 having parameters as at a point 18. The stream S32 having the parameters as at the point 18 is in a state of superheated vapor.

Thereafter, the stream S32 having the parameters as at the point 18 is sent back into the RHRVG, where it is cooled, transferring a portion of its heat or excess thermal energy to other streams in the RHRVG including a diesel exhaust gas stream E10 having initial parameters as at a point 600 in a heat exchange process 601-602 as described below. After passing through the RHRVG, the stream S32 having the parameters as at the point 18 is converted into a cooled spent intermediate working solution stream S34 having parameters as at a point 19.

Thereafter, the stream S34 having the parameters as at the point 19 is split into the returning intermediate working solution stream S20 having the parameters as at the point 20 and a second returning intermediate working solution stream S36 having parameters as at a point 12.

A major portion or the bulk of the stream S34 having the parameters as at the point 19 is sent into the stream S20 having the parameters as at the point 20. The stream S20 having the parameters as at the point 20 then passes through the third heat exchanger, HE3 as described above, where it is de-superheated a heat exchange process 20-15 and then partially condensed in a heat exchange process 15-14, providing heat for the heat exchange process 3-5-8 as described above. Thereafter, the stream S20 having the parameters as at the point 20 exits HE3 as the stream S24 having the parameters as at the point 14 as described above.

The other and smaller portion of the stream S34 having the parameters as at the point 19 is sent into the stream S36 having the parameters as at the point 12. The stream S36 having the parameters as at the point 12 is then forwarded through a fourth heat exchanger HE4. The stream S36 having the parameters as at the point 12 is de-superheated in a heat exchange process 12-6 and then partially condensed in a heat exchange process 6-13 providing heat for a heat exchange process 9-7-10 as described below forming a partially condensed stream S38 having parameters as at a point 13 and a partially vaporized, lean working solution stream S40 having parameters as at a point 10.

Thereafter, the streams S24 and S38 having the parameters as at the points 14 and 13, respectively, are combined, forming a combined intermediate working solution stream S42 having parameters as at a point 21, which is in a state of a vapor-liquid mixture. The stream S40 having the parameters as at the point 21 then enters into a gravity separator S1, where it is separated into a very rich saturated vapor stream S44 having parameters as at a point 22 and a lean liquid stream S46 having parameters as at a point 23.

The lean liquid stream S46 having the parameters as at the point 23, is then divided into two substreams S48 and S50 with parameters as at points 24 and 25, respectively. Thereafter, the stream S50 having the parameters as at the point 25 is combined with the very rich vapor stream S44 having the parameters as at the point 22 as described above, forming the rich working solution stream S14 having the parameters as at the point 26.

The stream S14 having the parameters as at the point 26 then passes through the second heat exchanger HE2, where it is partially condensed, forming the stream S18 having the parameters as at the point 27, and providing heat for the heat exchange process 2-3 as described above. The stream S18 having the parameters as at the point 27 is then sent into a first heat exchanger or condenser HE1, where it fully condensed, in counterflow with a coolant stream C12 having parameters as at a point 51 comprising water or air in a heat exchange process 51-52 or 27-1 as described below. After heat exchange, the rich working solution stream S18 is converted into the fully condensed, rich working solution stream S10 having the parameters as at the point 1 as described above and a spent coolant stream C14 having parameters as at a point 52.

The coolant stream C12 having parameters as at the point 51 is formed from a coolant stream Cd0 having initial parameters as at a point 50 by passed the coolant stream C10 through a pump P4 to increased its pressure and forming the coolant stream C12 having the parameters as at the point 51. When the coolant stream C12 is air, then the pump P4 is replace by a fan.

Meanwhile, the stream S48 having the parameters as at the point 24 as described above enters into a second or recirculating pump P2, where it is pumped to a required higher pressure, to from a higher pressure lean working solution stream S52 having parameters as at point 9. Thereafter, the stream S52 having the parameters as at the point 9 is sent into the fourth heat exchanger HE4, where it is heated in the heat exchange process 9-7-10, utilizing heat from the heat exchange process 12-6-13 as described above, forming the stream S40 having the parameters as at the point 10, where the parameters correspond to a state of subcooled liquid.

The stream S40 having the parameters as at the point 10 is then sent into the RHRVG, where it is heated, fully vaporized and superheated in a heat exchange process 10-30-31-29, exiting the RHRVG as the stream S28 having the parameters as at the point 29. The stream S28 having the parameters as at the point 29 is then mixed with stream S26 having the parameters as at the point 16, forming the stream S30 having the parameter as at the point 17 as described above.

Meanwhile, the stream E10 of hot exhaust gas with initial parameters as at point 600 is sent into the RHRVG, in counterflow to streams S40 having the parameter as at the point 10 and the stream S22 having the parameter as at the point 8, where it is cooled, in a heat exchange process 600-605-601-602, proving heat for the heat exchanges processes 10-30-31-29 and 8-4-11-16, to form a spent exhaust stream E12 having parameters as at a point 602, which is sent into a stack or other venting apparatus.

The process is closed with respect to the working solution stream.

In the embodiment of FIG. 1, the returning streams S32 and S34 having the parameters as at the points 18 and 19 move in counterflow with the streams S22 and S40 having the parameters as at the points 8 and 10, and in parallel flow with the exhaust gas stream E10 at the points 601 and 602. While the exhaust gas stream E10 in the heat exchange process 601-602 is cooled by the streams S22 and S40 having the parameters as at the points 8 and 10, it is at the same time heated by stream S32 having the parameters as at the point 18. This recuperative heating has an effect that is the equivalent of increasing a flow rate of gas in stream E10 at the points 601 and 602.

Figure 2:
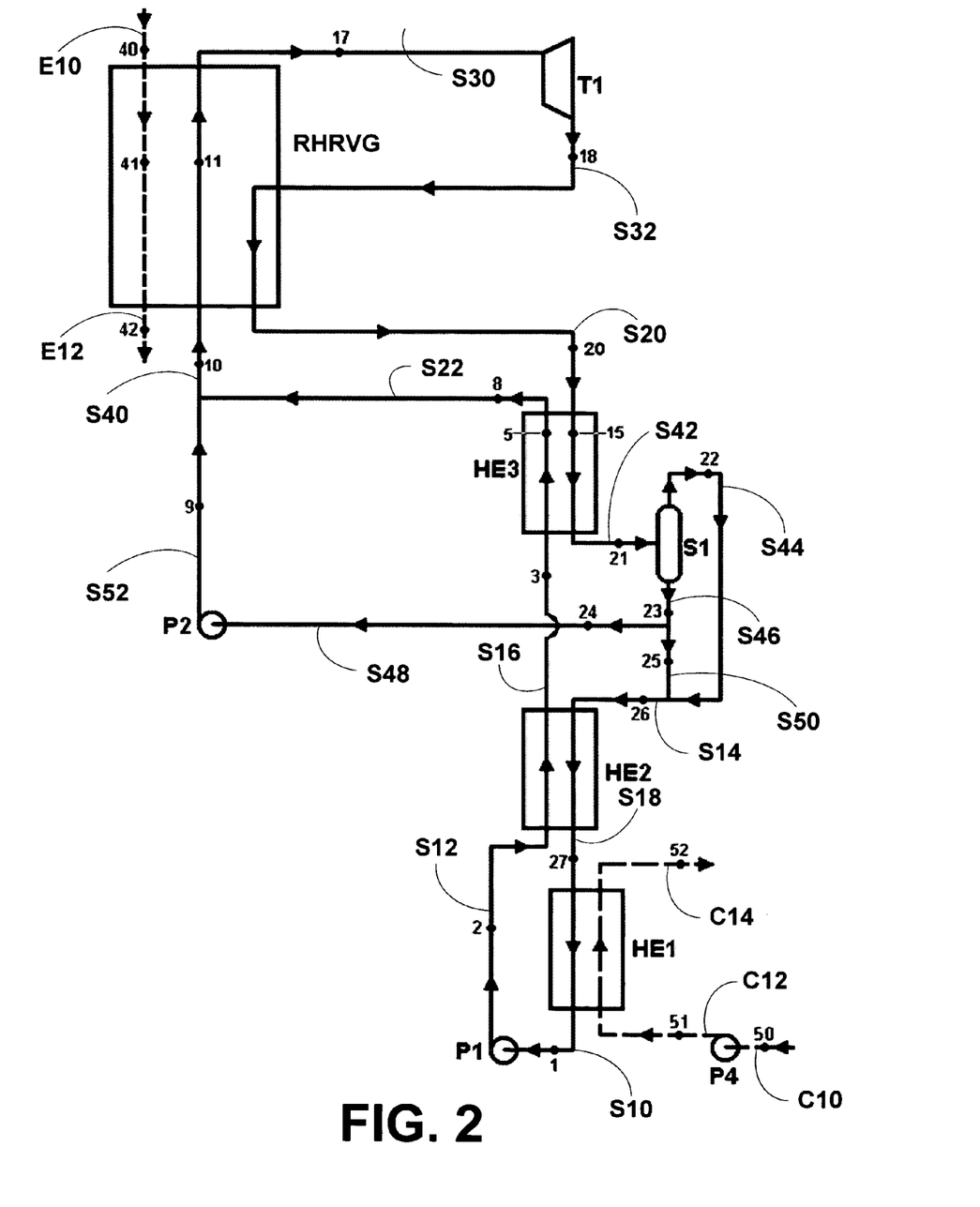
FIG. 2 an embodiment of an apparatus or system of this invention including a condenser HE1, two recuperative heat exchangers HE2 and HE3, a recuperative heat recovery vapor generator RHRVG, turbine T1, a separator S1 and three pumps P1, P2 and P4.

Referring now to FIG. 2, a flow diagram of a simplified version of the system of FIG. 1 is presented. In the simplified version, the recuperative heat exchanger HE4 is eliminated. Thus, the stream S52 having the parameters as at the point 9 is not preheated. Instead, the stream S52 having the parameters as at the point 9 is mixed with the stream S22 having the parameters as at the point 8, forming the intermediate solution stream S40 with the parameters as at the point 10 before entering into the RHRVG.

This simplified version of the proposed system has a reduced power output by approximately 4%.

Figure 3:
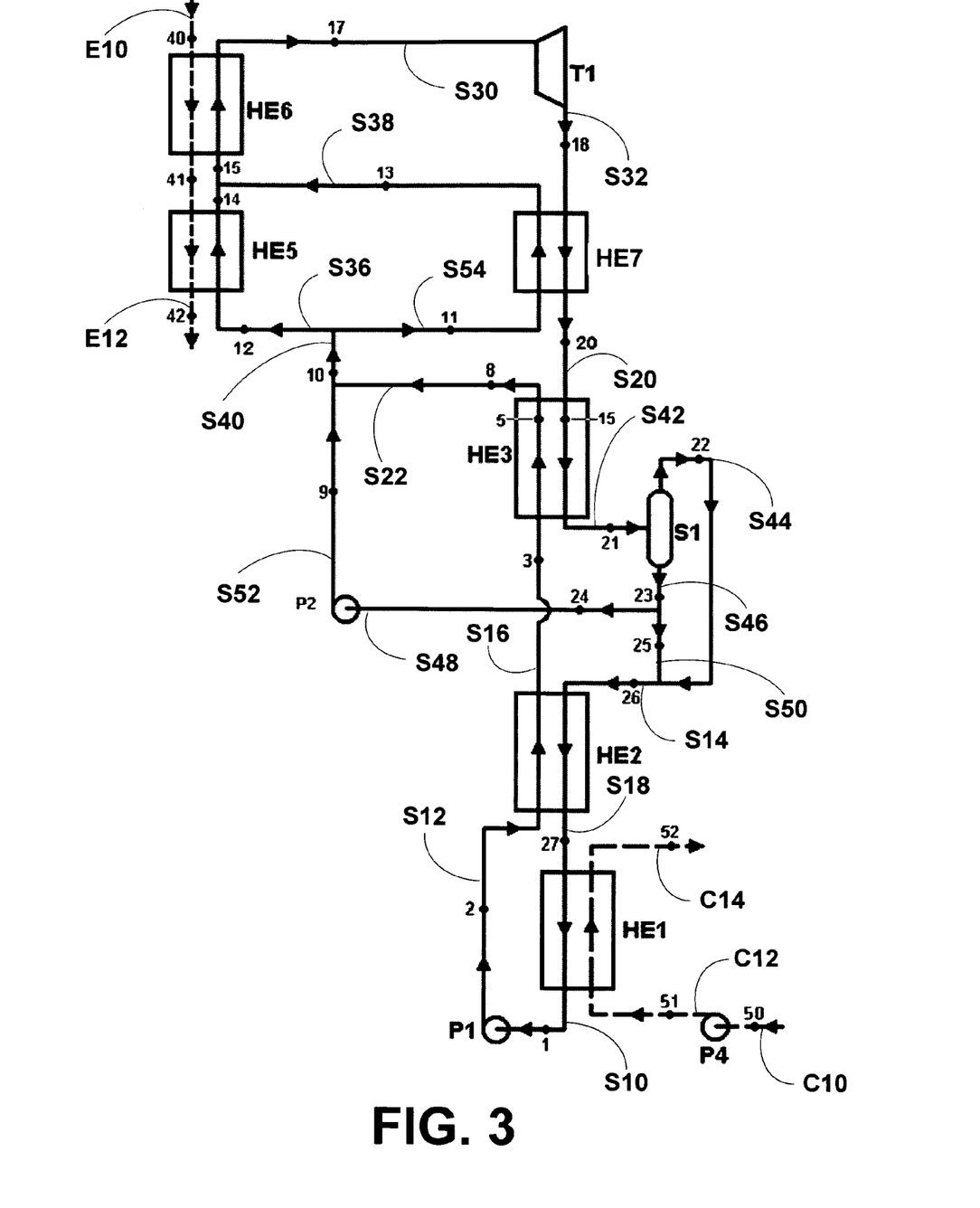
FIG. 3 an embodiment of an apparatus or system of this invention including a condenser HE1, three recuperative heat exchangers HE2, HE3 and HE4, a vaporizing heat exchange system including two heat exchanger HE5 and HE6, turbine T1, a separator S1 and three pumps P1, P2 and P4.

Referring now to FIG. 3, a flow diagram of another simplified version of the system of FIG. 2, where the RHRVG, if not desirable, (e.g., the heat source stream is a liquid), then the RHRVG can be replaced by three separate heat exchangers (HE7, HE5, and HE6). In this case, the stream S40 is split into the stream S36 having the parameters as at the point 12 and a new stream S54 having parameters as at a point 11 which is sent through the seventh heat exchanger HE7 to form the stream S38 having parameters as at the point 13.

The systems of this invention, utilizing intermediate temperature heat sources, provide a power output which is approximately 15% higher, for a given heat source, than the output of a conventional Rankine cycle used for the same purposes and with the same constraints.

It has been calculated that if used with the exhaust from a 3 MW (megawatt) diesel engine as a heat source, the systems of this invention would produce a net output of 840 kW, or 810 kW for the simplified version. This corresponds to a 28% increase in power output from the diesel engine when combined with the systems of this invention.

The typical parameters of the state points of the proposed system (as shown in FIG. 1) are presented in Table 1.

TABLE 1

System Point Summary

Working Fluid

| Pt. | X kg/kg | T °C. | P bar | H kJ/kg | S kJ/kg-K | Ex kJ/kg | Grel G/G = 1 | Gabs kg/s | Ph. | Wetness/T (kg/kg)/°C. |
|---|---|---|---|---|---|---|---|---|---|---|
| 1 | 0.9300 | 20.99 | 8.228 | 42.84 | 0.3214 | 141.39 | 1.00000 | 1.799 | Mix | 1 |
| 2 | 0.9300 | 22.13 | 49.016 | 50.55 | 0.3259 | 147.81 | 1.00000 | 1.799 | Liq | −70.46° C. |
| 3 | 0.9300 | 91.87 | 48.327 | 404.38 | 1.3987 | 196.89 | 1.00000 | 1.799 | Mix | 1 |
| 4 | 0.9300 | 166.54 | 47.983 | 1,629.70 | 4.6038 | 511.66 | 1.00000 | 1.799 | Vap | 17.9° C. |
| 5 | 0.9300 | 123.92 | 48.217 | 1,317.90 | 3.8479 | 414.59 | 1.00000 | 1.799 | Mix | 0.1182 |
| 6 | 0.7433 | 126.70 | 8.614 | 1,838.16 | 5.7508 | 392.31 | 0.09023 | 0.162 | Mix | 0 |
| 7 | 0.3009 | 123.92 | 48.217 | 354.09 | 1.5222 | 104.95 | 0.42209 | 0.759 | Liq | −60.85° C. |
| 8 | 0.9300 | 132.72 | 48.189 | 1,402.50 | 4.0588 | 439.27 | 1.00000 | 1.799 | Mix | 0.0776 |
| 9 | 0.3009 | 95.59 | 48.327 | 220.57 | 1.1733 | 70.54 | 0.42209 | 0.759 | Liq- | 89.34° C. |
| 10 | 0.3009 | 126.75 | 48.189 | 367.66 | 1.5562 | 108.85 | 0.42209 | 0.759 | Liq | −57.98° C. |
| 11 | 0.9300 | 184.61 | 47.959 | 1,686.16 | 4.7298 | 532.30 | 1.00000 | 1.799 | Vap | 36° C. |
| 12 | 0.7433 | 152.72 | 8.642 | 1,901.68 | 5.9032 | 412.52 | 0.09023 | 0.162 | Vap | 25.9° C. |
| 13 | 0.7433 | 98.86 | 8.504 | 1,213.62 | 4.1449 | 223.98 | 0.09023 | 0.162 | Mix | 0.2727 |
| 14 | 0.7433 | 94.65 | 8.504 | 1,152.27 | 3.9791 | 209.74 | 1.33186 | 2.396 | Mix | 0.2985 |
| 15 | 0.7433 | 126.70 | 8.614 | 1,838.16 | 5.7508 | 392.31 | 1.33186 | 2.396 | Mix | 0 |
| 16 | 0.9300 | 349.64 | 47.500 | 2,161.41 | 5.6218 | 754.15 | 1.00000 | 1.799 | Vap | 201.4 C. |
| 17 | 0.7433 | 350.00 | 47.500 | 2,344.37 | 5.9689 | 836.55 | 1.42209 | 2.559 | Vap | 158.9° C. |
| 18 | 0.7433 | 187.86 | 8.849 | 1,986.06 | 6.0826 | 445.95 | 1.42209 | 2.559 | Vap | 60.3° C. |
| 19 | 0.7433 | 152.72 | 8.642 | 1,901.68 | 5.9032 | 412.52 | 1.42209 | 2.559 | Vap | 25.9° C. |
| 20 | 0.7433 | 152.72 | 8.642 | 1,901.68 | 5.9032 | 412.52 | 1.33186 | 2.396 | Vap | 25.9° C. |
| 21 | 0.7433 | 94.92 | 8.504 | 1,156.16 | 3.9897 | 210.63 | 1.42209 | 2.559 | Mix | 0.2968 |
| 22 | 0.9300 | 94.92 | 8.504 | 1,553.56 | 5.1797 | 271.89 | 0.99997 | 1.799 | Mix | 0 |
| 23 | 0.3009 | 94.92 | 8.504 | 214.75 | 1.1705 | 65.52 | 0.42212 | 0.759 | Mix | 1 |
| 24 | 0.3009 | 94.92 | 8.504 | 214.75 | 1.1705 | 65.52 | 0.42209 | 0.759 | Mix | 1 |
| 25 | 0.3009 | 94.92 | 8.504 | 214.75 | 1.1705 | 65.52 | 0.00003 | 0.000 | Mix | 1 |
| 26 | 0.9300 | 94.92 | 8.504 | 1,553.46 | 5.1794 | 271.87 | 1.00000 | 1.799 | Mix | 0.0001 |
| 27 | 0.9300 | 54.39 | 8.366 | 1,199.62 | 4.1750 | 203.39 | 1.00000 | 1.799 | Mix | 0.1321 |
| 29 | 0.3009 | 350.00 | 47.500 | 2,777.83 | 6.4568 | 1,126.79 | 0.42209 | 0.759 | Vap | 111.4° C. |
| 30 | 0.3009 | 166.54 | 48.133 | 564.29 | 2.0248 | 172.37 | 0.42209 | 0.759 | Liq | −18.12° C. |
| 31 | 0.3009 | 184.61 | 48.106 | 658.39 | 2.2345 | 206.89 | 0.42209 | 0.759 | Mix | 1 |

Heat Source

| Pt. | X kg/kg | T C. | P bar | H kJ/kg | S kJ/kg-K | Ex kJ/kg | Grel G/G = 1 | Gabs kg/s | Ph. | Wetness/T (kg/kg)/°C. |
|---|---|---|---|---|---|---|---|---|---|---|
| 600 | GAS | 440.00 | 1.082 | 671.96 | 1.8029 | 205.12 | 4.96643 | 8.936 | Vap | 389.8° C. |
| 601 | GAS | 177.86 | 1.076 | 376.77 | 1.2899 | 55.69 | 4.96643 | 8.936 | Vap | 127.8° C. |
| 602 | GAS | 142.72 | 1.075 | 338.47 | 1.2017 | 42.44 | 4.96643 | 8.936 | Vap | 92.7° C. |
| 605 | GAS | 195.54 | 1.076 | 396.13 | 1.3319 | 63.12 | 4.96643 | 8.936 | Vap | 145.4° C. |
| 614 | GAS | 142.72 | 1.075 | 338.47 | 1.2017 | 42.44 | 8.09982 | 14.573 | Vap | 92.7° C. |
| 615 | GAS | 142.72 | 1.075 | 338.47 | 1.2017 | 42.44 | 3.13340 | 5.638 | Vap | 92.7° C. |
| 616 | GAS | 177.86 | 1.076 | 376.77 | 1.2899 | 55.69 | 3.13340 | 5.638 | Vap | 127.8° C. |
| 617 | GAS | 177.86 | 1.076 | 376.77 | 1.2899 | 55.69 | 8.09982 | 14.573 | Vap | 127.8° C. |
| 620 | GAS | 440.00 | 1.082 | 671.96 | 1.8029 | 205.12 | 1.72304 | 3.100 | Vap | 389.8° C. |
| 621 | GAS | 195.54 | 1.076 | 396.13 | 1.3319 | 63.12 | 1.72304 | 3.100 | Vap | 145.4° C. |
| 622 | GAS | 440.00 | 1.082 | 671.96 | 1.8029 | 205.12 | 3.24339 | 5.836 | Vap | 389.8° C. |
| 623 | GAS | 195.54 | 1.076 | 396.13 | 1.3319 | 63.12 | 3.24339 | 5.836 | Vap | 145.4° C. |
| 624 | GAS | 195.54 | 1.076 | 396.13 | 1.3319 | 63.12 | 2.05102 | 3.690 | Vap | 145.4° C. |
| 625 | GAS | 177.86 | 1.076 | 376.77 | 1.2899 | 55.69 | 2.05102 | 3.690 | Vap | 127.8° C. |
| 626 | GAS | 177.86 | 1.076 | 376.77 | 1.2899 | 55.69 | 2.16714 | 3.899 | Vap | 127.8° C. |
| 627 | GAS | 142.72 | 1.075 | 338.47 | 1.2017 | 42.44 | 2.16714 | 3.899 | Vap | 92.7° C. |
| 628 | GAS | 177.86 | 1.076 | 376.77 | 1.2899 | 55.69 | 5.93269 | 10.674 | Vap | 127.8° C. |
| 629 | GAS | 142.72 | 1.075 | 338.47 | 1.2017 | 42.44 | 5.93269 | 10.674 | Vap | 92.7° C. |
| 630 | GAS | 195.54 | 1.076 | 396.13 | 1.3319 | 63.12 | 2.91541 | 5.245 | Vap | 145.4° C. |
| 631 | GAS | 177.86 | 1.076 | 376.77 | 1.2899 | 55.69 | 2.91541 | 5.245 | Vap | 127.8° C. |

Coolant

| Pt. | X kg/kg | T °C. | P bar | H kJ/kg | S kJ/kg-K | Ex kJ/kg | Grel G/G = 1 | Gabs kg/s | Ph. | Wetness/T (kg/kg)/°C. |
|---|---|---|---|---|---|---|---|---|---|---|
| 50 | Water | 10.94 | 1.013 | 46.08 | 0.1650 | 0.10 | 18.9053 | 34.015 | Liq | −89.03° C. |
| 51 | Water | 10.99 | 1.703 | 46.35 | 0.1658 | 0.17 | 18.9053 | 34.015 | Liq | −104.21° C. |
| 52 | Water | 25.63 | 1.013 | 107.54 | 0.3760 | 1.63 | 18.9053 | 34.015 | Liq | −74.35° C. |

The state point in table which are not shown in FIG. 1 are "virtual points" used in the computational process.

A summary is performance and power output for the system shown in FIG. 1 is presented in Table 2.

TABLE 2

Plant Performance Summary

| | | | |
|---|---|---|---|
| Heat in | 2,979.88 | kW | 1,656.22 kJ/kg |
| Heat rejected | 2,081.29 | kW | 1,156.78 kJ/kg |
| Turbine enthalpy Drops | 916.78 | kW | 509.55 kJ/kg |
| Gross Generator Power | 874.19 | kW | 485.88 kJ/kg |
| Process Pumps (−10.16) | −19.66 | kW | −10.93 kJ/kg |
| Cycle Output | 854.53 | kW | 474.95 kJ/kg |
| Other Pumps and Fans (−5.21) | −10.07 | kW | −5.60 kJ/kg |
| Net Output | 844.46 | kW | 469.35 kJ/kg |
| Gross Generator Power | 874.19 | kW | 485.88 kJ/kg |
| Cycle Output | 854.53 | kW | 474.95 kJ/kg |
| Net Output | 844.46 | kW | 469.35 kJ/kg |
| Net thermal efficiency | 28.34% | % | |
| Second Law Limit | 48.78% | % | |
| Second Law Efficiency | 58.09% | % | |

Overall Heat Balance kJ/kg
Heat In: Source + pumps = 1,656.22 + 10.16 = 1,666.39
Heat Out: Turbines + condenser = 509.55 + 1,156.78 = 1,666.33

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. An apparatus for increasing power output of small internal combustion electric generators comprising:
   a heat exchange/condensation component including:
      a condenser HE1,
      two recuperative heat exchangers HE2 and HE3,
      a separator S1, and
      and two pumps P1 and P2,
   where:
      the heat exchange/condensation component converts a spent intermediate working solution stream into a very rich working solution stream and a lean working solution stream, where a portion of the lean working solution stream and the very rich working solution stream are combined to form a rich working solution stream, heat from the spent intermediate working solution stream prior to separation and heat from the rich working solution stream are used to heat and partially vaporize a fully condensed, higher pressure, rich working solution stream, and
      the pumps increase a pressure of the remainder of the lean working solution stream to form a higher pressure, lean working solution stream and a pressure of the fully condensed, rich working solution stream to form the fully condensed, higher pressure, rich working solution stream;
   a recuperative heat recovery vapor generator RHRVG adapted to form a fully vaporized, intermediate working solution stream with heat derived from an external heat source stream and from the spent intermediate working solution stream prior to partially vaporizing the fully condensed, higher pressure, rich working solution stream, and
   a turbine T1 adapted to convert a portion of thermal energy in the fully vaporized, intermediate working solution stream into a useable form of energy producing the spent intermediate working solution stream.

2. The apparatus of claim 1, wherein the heat exchange/condensation component further includes a third recuperative heat exchanger HE4, which heats the higher pressure, lean working solution stream with heat from a portion of the spent intermediate working solution and the RHRVG fully vaporizes the heated higher pressure, lean working solution stream and the partially vaporized, higher pressure, rich working solution stream.

3. The apparatus of claim 1, wherein the RHRVG fully vaporizes and superheats the higher pressure, intermediate working solution stream to form a fully vaporized and superheated intermediate working solution stream, where the intermediate, higher pressure, working solution stream is formed by combining the higher pressure, lean working solution stream and the partially vaporized, rich working solution stream prior to the intermediated, higher pressure, working solution stream entering the RHRVG.

4. The apparatus of claim 3, wherein the RHRVG comprises two heat exchanger HE5, HE6 and HE7.

5. The apparatus of claim 1, wherein the working solution streams comprise multi-component fluids having different concentrations of at least two components with different normal boiling temperatures, higher boiling components and lower boiling components.

6. The apparatus of claim 5, wherein the multi-component fluids comprises an ammonia-water mixture, a mixture of two or more hydrocarbons, a mixture of two or more freons, or a mixture of hydrocarbons and freons.

7. The apparatus of claim 5, wherein the multi-component fluids comprises an ammonia-water mixture.

8. The apparatus of claim 7, wherein the working solution streams have compositions of the lower boiling component and higher boiling component such that [lower boiling component]$_{very\ rich}$>[lower boiling component]$_{rich}$>[lower boiling component]$_{intermediate}$>[lower boiling component]$_{lean}$ and conversely [higher boiling component]$_{lean}$>[higher boiling component]$_{intermediate}$>[higher boiling component]$_{rich}$>[higher boiling component]$_{very\ rich}$.

9. A system comprising:
   an internal combustion engine,
   a recuperative heat recovery vapor generator (RHRVG) connected to an exhaust of the engine and designed to utilize heat in the exhaust gases and heat in a spent intermediate working solution stream to form a fully vaporized, higher pressure, intermediate working solution stream,
   a turbine connected to the RHRVG for converting a portion of thermal energy in the fully vaporized, higher pressure intermediate working solution stream into a usable form of energy to form the spent intermediate working solution stream, and
   a heat exchange/condensation subsystem connected to the turbine, the RHRVG, and an external coolant stream, where the subsystem: (a) produces a very rich working solution stream, a lean working solution stream and a rich working solution stream, (b) fully condenses the rich working solution stream, (c) increases a pressure of the fully condensed rich working solution stream to form a fully condensed, higher pressure, rich working solution stream and a pressure of a portion of the lean working solution stream to form a higher pressure, lean working solution stream, and (d) heating and partially vaporizing the fully condensed, higher pressure, rich working solution stream to form a partially vaporized, higher pressure, rich working solution stream.

10. The system of claim 9, wherein the heat exchange/condensation subsystem comprises:
a condenser HE1,
two recuperative heat exchangers HE2 and HE3,
a separator S1, and
and two pumps P1 and P2,
where:
the separator S1 converts the spent intermediate working solution stream into the very rich working solution stream and a lean working solution stream, where a portion of the lean working solution stream and the very rich working solution stream are combined to form the rich working solution stream,
the condenser HE1 fully condenses the rich working solution stream with an external coolant to form the fully condensed, rich working solution stream,
the heater exchangers HE2 and HE3 use heat from the spent intermediate working solution stream prior to separation in the separator S1 and heat from the rich working solution stream are used to heat and partially vaporize a fully condensed, higher pressure, rich working solution stream,
the pump P2 increase a pressure of a remainder of the lean working solution stream to form the higher pressure, lean working solution stream and the pump P1 increases a pressure of the fully condensed, rich working solution stream to form the fully condensed, higher pressure, rich working solution stream, and
the higher pressure, lean stream and the partially vaporized, higher pressure, rich working solution stream are combined to form a higher pressure, intermediate working solution stream prior to the higher pressure, intermediate working solution stream entering the RHRVG.

11. The system of claim 10, wherein the heat exchange/condensation subsystem further includes a third recuperative heat exchanger HE4, which heats the higher pressure, lean working solution stream with heat from a portion of the spent intermediate working solution and the RHRVG fully vaporizes the heated higher pressure, lean working solution stream and the partially vaporized, higher pressure, rich working solution stream.

12. The system of claim 9, wherein the RHRVG fully vaporizes and superheats the higher pressure, intermediate working solution stream to form a fully vaporized and superheated intermediate working solution stream, where the intermediate, higher pressure, working solution stream is formed by combining the higher pressure, lean working solution stream and the partially vaporized, rich working solution stream prior to the intermediated, higher pressure, working solution stream entering the RHRVG.

13. The system of claim 12, wherein the RHRVG comprises two heat exchanger HE5, HE6 and HE7.

14. The system of claim 9, wherein the working solution stream comprise multi-component fluids having different concentration of at least two components with different normal boiling temperatures, higher boiling components and lower boiling components.

15. The system of claim 14, wherein the multi-component fluids comprises an ammonia-water mixture, a mixture of two or more hydrocarbons, a mixture of two or more freons, or a mixture of hydrocarbons and freons.

16. The system of claim 15, wherein the multi-component fluids comprises an ammonia-water mixture.

17. The system of claim 15, wherein the working solution streams have compositions of the lower boiling component and higher boiling component such that [lower boiling component]$_{very\ rich}$>[lower boiling component]$_{rich}$>[lower boiling component]$_{intermediate}$>[lower boiling component]$_{lean}$ and conversely [higher boiling component]$_{lean}$>[higher boiling component]$_{intermediate}$>[higher boiling component]$_{rich}$>[higher boiling component]$_{very\ rich}$.

18. A method, for converting a portion of waste thermal energy generated by an internal combustion engine into a usable form of energy, comprising the steps of:
combusting a fuel in an internal combustion engine including an exhaust system,
forming a fully vaporized, intermediate working solution stream, with heat from an exhaust gas stream from the exhaust system and heat from a spent intermediate working solution stream, in a recuperative heat recovery vapor generator (RHRVG) including a plurality of heat exchange stages;
converting a portion of thermal energy in the fully vaporized, intermediate working solution stream to a usable form of energy in a turbine to form the spent intermediate working solution stream; and
passing the spent working solution stream, after exiting the RHRVG through a heat exchange/condensation subsystem, where the subsystem: (a) produces a very rich working solution stream, a lean working solution stream and a rich working solution stream, (b) fully condenses the rich working solution stream, (c) increases a pressure of the fully condensed, rich working solution stream to form a fully condensed, higher pressure, rich working solution stream and a pressure of a portion of the lean working solution stream to form a higher pressure, lean working solution stream and (d) heating and partially vaporizing the fully condensed, higher pressure, rich working solution stream.

19. The method of claim 18, wherein the heat exchange/condensation system comprises:
a condenser HE1,
two recuperative heat exchangers HE2 and HE3,
a separator S1, and
and two pumps P1 and P2,
where:
the separator S1 converts the spent intermediate working solution stream into the very rich working solution stream and a lean working solution stream, where a portion of the lean working solution stream and the very rich working solution stream are combined to form the rich working solution stream,
the condenser HE1 fully condenses the rich working solution stream with an external coolant to form the fully condensed, rich working solution stream,
the heater exchangers HE2 and HE3 use heat from the spent intermediate working solution stream prior to separation in the separator S1 and heat from the rich working solution stream are used to heat and partially vaporize a fully condensed, higher pressure, rich working solution stream, the pump P2 increase a pressure of a remainder of the lean working solution stream to form the higher pressure, lean working solution stream and the pump P1 increases a pressure of the fully condensed, rich working solution stream to form the fully condensed, higher pressure, rich working solution stream, and
the higher pressure, lean stream and the partially vaporized, higher pressure, rich working solution stream are combined to form a higher pressure, intermediate working solution stream prior to the higher pressure, intermediate working solution stream entering the RHRVG.

20. The method of claim 19, wherein the heat exchange/condensation component further includes a third recuperative heat exchanger HE4, which heats the higher pressure, lean working solution stream with heat from a portion of the spent intermediate working solution and the RHRVG fully vaporizes the heated higher pressure, lean working solution stream and the partially vaporized, higher pressure, rich working solution stream.

21. The method of claim 18, wherein the RHRVG fully vaporizes and superheats the higher pressure, intermediate working solution stream to form a fully vaporized and superheated intermediate working solution stream, where the intermediate, higher pressure, working solution stream is formed by combining the higher pressure, lean working solution stream and the partially vaporized, rich working solution stream prior to the intermediated, higher pressure, working solution stream entering the RHRVG.

22. The method of claim 21, wherein the RHRVG comprises two heat exchanger HE5, HE6 and HE7.

23. The method of claim 18, wherein the working solution stream comprise multi-component fluids having different concentration of at least two components with different normal boiling temperatures, higher boiling components and lower boiling components.

24. The method of claim 23, wherein the multi-component fluids comprises an ammonia-water mixture, a mixture of two or more hydrocarbons, a mixture of two or more freons, or a mixture of hydrocarbons and freons.

25. The method of claim 24, wherein the multi-component fluids comprises an ammonia-water mixture.

26. The method of claim 25, wherein the working solution streams have compositions of the lower boiling component and higher boiling component such that [lower boiling component]$_{very\ rich}$>[lower boiling component]$_{rich}$>[lower boiling component]$_{intermediate}$>[lower boiling component]$_{lean}$ and conversely [higher boiling component]$_{lean}$>[higher boiling component]$_{intermediate}$>[low higher boiling component]$_{rich}$>[low higher boiling component]$_{very\ rich}$.

* * * * *